United States Patent Office 3,761,334
Patented Sept. 25, 1973

3,761,334
METHOD OF PROTECTING THE HULLS OF MARINE VESSELS FROM FOULING
Klaus Zondek, Callao 3385, Santiago, Chile
Filed Oct. 21, 1971, Ser. No. 191,233
Int. Cl. B63b 3/10
U.S. Cl. 156—71
12 Claims

ABSTRACT OF THE DISCLOSURE

The hull of a marine vessel is protected from fouling by marine growths by a foil of anti-fouling metal such as copper or a copper alloy adhesively bonded throughout its area to the hull below the water line. The foil is conveniently applied to the hull by pressure sensitive or heat sensitive adhesive.

---

The present invention relates to protecting the hulls of marine vessels from fouling by marine growths.

The fouling of the hulls of marine vessels by marine growths has for centuries presented a serious problem. Animal growths such as barnacles and plant life such as marine grass attach themselves firmly to the hulls of ships and boats. On ships these growths increase the resistance to movement of the ship through the water thereby decreasing its speed and increasing the amount of fuel required for power. On motor boats and sail boats, the speed is likewise reduced. Many thousands of dollars are spent each year in removing marine growths from the hulls of boats and ships and in efforts to protect the hulls from fouling.

At present, the principal method used to inhibit the fouling of marine vessels by marine growths is to paint the underwater portion of the hull with an anti-fouling paint. Such paints customarily contain copper compounds, mercury compounds or other compositions that are poisonous to barnacles and other marine growths. However, such paints have been found to be of limited effectiveness. In particular, the length of time during which protection is afforded is relatively short, for example four or five months or even less in warmer waters where the marine growths grow more rapidly. The vessel must then be taken out of the water and to have its hull cleaned and repainted. This is an expensive operation particularly in the case of large ships.

It is an object of the present invention to provide anti-fouling protection that can be easily applied, is effective for a long period of time and is economical. The method in accordance with the present invention is applicable to boats and ships of all sizes where anti-fouling protection is required.

In the following description of the method of preventing the fouling of marine vessels by marine growths, reference is made to the accompanying drawings in which.

Figure 1:
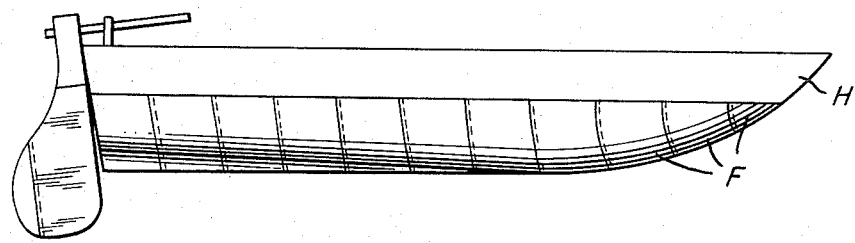
FIG. 1 is a schematic side view of a boat having a contoured hull provided with anti-fouling protection in accordance with the invention.

In accordance with the invention, the hull of a marine vessel is protected from fouling by marine growths by applying to the hull a foil of anti-fouling metal which is adhesively bonded throughout its area to the hull. The metal used is of a composition which by the metal itself or by compounds which form on the surface of the metal inhibit the attachment of marine growths to the hull. A suitable metal is copper which has effective anti-fouling properties and is sufficiently ductile that it can readily be formed into a foil and can easily be applied in foil form to the hull of a marine vessel. Alloys of copper with other metals, for example zinc, tin and mercury may also be used. Other anti-fouling materials, for example metal salts can be incorporated either by mixing with the selected metal or by being rolled into it or laminated with it during the operation of rolling the metal into a foil. The foil should be sufficiently thin that it can be easily applied and does not require an excessive amount of metal and on the other hand should be sufficiently thick to provide protection for a reasonable amount of time, for example from two to five years. Depending on the size of the boat or ship, the type of service in which it is used and the character of the waters in which it operates, the thickness of the foil should be between .05 and 2 mm., and preferably between .1 and .5 mm.

The foil is preferably provided in the form of strips of a width which is easy and convenient to apply to the hull. For the hulls of smaller boats having appreciable curvature, it is more convenient to use relatively narrow strips which can be made to conform more readily to the curvature of the hull. For larger boats and ships the foil is preferably wider so as to speed the application of the foil to the hull. It has been found that for smaller boats foil strips which are 6 inches to 12 inches wide are conveniently used. For larger boats and ships, foil strips having a width of from 1 foot to three feet may be used.

The adhesive used in applying the foil to the hull of a vessel is selected from the properties of facilitating application of the foil to the hull and providing a secure bond throughout the area of the foil. An adhesive having such properties is pressure sensitive adhesive of the kind used on pressure sensitive tape such as "Scotch" tape. Such adhesive is applied to one face of the foil while an anti-adhesive coating such as a silicon composition is applied to the other face so that the foil does not stick too tightly to itself when wound into a roll after coating. The adhesively coated foil strip can then be applied to the hull of a marine vessel in much the same manner that "Scotch" tape is applied to a surface. Alternatively, one face of the foil and preferably also the surface of the hull are coated with an adhesive that is thermoplastic and hence heat sensitive. The foil is then applied to the hull with heat and pressure for example by means of a heated roller. Another type of adhesive that may be used is rubber cement or other elastomer adhesive such as a neoprene composition which as the property of bonding to itself. The hull and one face of the foil strip are coated with such adhesive which is allowed to set until the surface is dry. The coated surface of the foil is then pressed onto the hull whereupon the adhesive bonds to the adhesive coating on the hull thereby securing the foil to the hull. As adhesives of the kinds referred to are well known, no detail description of their composition is required.

The method in accordance with the present invention is applicable to steel, aluminum, wood and fiber glass hulls. The hull should be properly prepared before the metal foil is applied to it. A new steel hull should be protected against rusting, for example by suitable anti-rust paint. At least the final coat of paint is preferably an epoxy paint which provides a smooth uniform firm surface for the bonding of the foil to it. If the vessel is already in use and has been previously painted with anti-fouling paint, the hull should be thoroughly cleaned and at least all loose paint should be removed. Suitable anti-rust paint may then be used as for a new hull. An aluminum hull should be protected against corrosion, for example by anodizing or by painting with an epoxy or other paint. A new wood hull, whether plank or plywood, should be painted with a suitable filler depending on the type of wood and given at least one coat of hard, highly adhesive paint, for example epoxy. A wood hull that is already in use should be thoroughly cleaned and at least all loose paint should be removed. It should then be painted, for example with epoxy paint, in order to seal the wood from moisture. A new fiber glass hull requires no special preparation. The foil is applied with adhesive directly to the fiber glass hull. If it is a used boat which has previously been painted with anti-fouling paint, the old paint or at least all of the old paint that is loose should be removed before the foil is applied.

Figure 2:
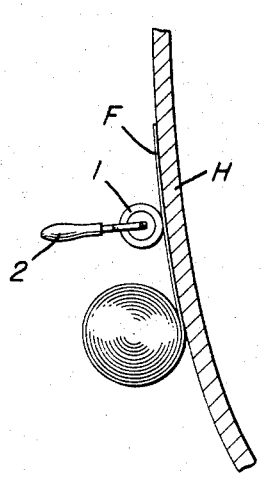
FIG. 2 is a schematic fragmentary view illustrating the method in accordance with the invention.

FIG. 2 illustrates application of the foil to the hull of a vessel. As the foil F is unrolled from a roll of foil it is pressed onto the hull H by means of a pressure roller 1 having a handle 2. The roller 1 is preferably formed of neoprene or other elastomeric material so that it conforms closely to the hull of the vessel and presses the foil into firm contact with the hull throughout the area of the foil. The roller 1 is preferably coated with a silicone compound or other non-adhesive coating so that it has no tendency to stick to the foil. In applying the foil to a small boat which has appreciable curvature in cross section, the foil strips are preferably applied either diagonally or vertically as illustrated in FIG. 1 so as to conform more readily to the curvature of the hull. Application of the foil should be started at the stern of the vessel and successive strips of foil should preferably be overlapped slightly so that the forward edge of each strip is protected by the next forward strip. Hence, when the vessel is moving in a forward direction, water does not tend to get under the foil strips. When heat sensitive adhesive is used, the roller 1 is suitably heated or other means is provided for heating the foil as it is applied to the hull.

Figure 3:
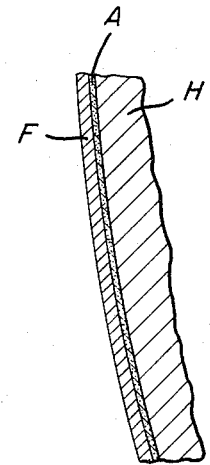
FIG. 3 is a schematic enlarged sectional view representing a portion of the hull with anti-fouling protection applied thereto.

FIG. 3 illustrates schematically in enlarged cross section how the foil F is bonded to the surface of the hull H by an intervening adhesive layer A. The thickness of the foil and of the adhesive layer are exaggerated for clarity. The layer of adhesive between the foil and hull insulates the foil from the hull when the hull is formed of metal. In the case of a wood hull, the adhesive provides an additional coating protecting the hull. The adhesive is of a character that remains flexible and retains its adhesiveness for the life of the foil covering. It is hence not damaged by an impact of the hull. When the adhesive of a character that remains elastic and is of sufficient thickness, it forms a cushion layer between the foil and the boat hull, thereby providing better protection against damage to the hull or the foil covering by impact.

The foil covering in accordance with the present invention provides a smooth clean surface which reduces resistance to movement of the vessel through the water and hence provides greater speed and efficiency of the vessel. Moreover, the foil covering has been found to provide anti-fouling protection over a much longer period than is attainable with presently available anti-fouling paints.

What I claim and desire to secure by Letters Patent is:

1. A method of protecting the contoured hull of a marine vessel from marine growth which comprises providing a metal foil of anti-fouling metal in strip form and progressively rolling said foil strip into conforming pressure contact with said hull with a layer of adhesive between said foil strip and the hull surface to adhesively bond said foil throughout its area to the exterior surface of said contoured hull below the water line, said foil being sufficiently thin to be easily applied and sufficiently thick to provide protection against fouling for a period of from two to five years.

2. A method according to claim 1, in which said foil is of copper or copper alloy.

3. A method according to claim 1, in which said foil has a thickness between 0.05 mm. and 2 mm.

4. A method according to claim 3, in which said foil has a thickness between 0.1 mm. and 0.5 mm.

5. A method according to claim 1, in which the bonding of said foil to said hull comprises coating one face of said foil with pressure-sensitive adhesive and pressing said coated face of the foil onto said hull.

6. A method according to claim 5, further comprising coating the opposite face of said foil with an adhesion-resistant silicone compound.

7. A method according to claim 1, in which the bonding of said foil to said hull comprises coating said hull and one face of said foil with heat-sensitive adhesive and pressing the coated face of said foil onto said coated hull while applying heat to said foil.

8. A method according to claim 1, in which the bonding of said foil to said hull comprises coating said hull and one face of said foil with an elastomeric base adhesive and thereafter pressing the coated face of said foil onto said coated hull.

9. A method according to claim 1, in which said foil strip has a width of the order of 6 inches to 12 inches and is provided in the form of a roll, said foil strip being rolled from said roll onto said hull.

10. A method according to claim 1, in which said foil strip has a width of the order of one to three feet and is provided in the form of a roll, said foil strip being rolled from said roll onto said hull.

11. A method according to claim 1, in which said foil strips are applied to said hull transversely to the forward direction of travel of said vessel and are applied successively from the stern to the bow of said vessel with successive strips overlapping, whereby the rearward flow of water over the hull during forward movement of the vessel does not act to lift said foil from the surface of the hull.

12. A method according to claim 1, in which said adhesive is of a character that remains elastic and is of a thickness to form a cushion layer between the foil and said hull.

References Cited

UNITED STATES PATENTS

| | | | |
|---|---|---|---|
| 3,426,473 | 2/1969 | Cardarelli et al. | 106—15 A F |
| 3,600,263 | 8/1971 | Lapitz | 161—216 X |
| 3,654,016 | 4/1972 | Alexander | 156—233 X |

EDWARD G. WHITBY, Primary Examiner

U.S. Cl. X.R.

114—69, 222; 156—196, 233, 289, 329, 338; 161—216, 217, 221, 406